(12) United States Patent
Stuetz et al.

(10) Patent No.: US 7,504,933 B2
(45) Date of Patent: Mar. 17, 2009

(54) METHOD FOR CONTROLLING AN ACTIVE RESTRAINT SYSTEM

(75) Inventors: Michael Stuetz, Gschwend (DE); Uwe Class, Schechingen (DE)

(73) Assignee: TRW Automotive GmbH, Aldorf (DE)

( * ) Notice: Subject to any disclaimer, the term of this patent is extended or adjusted under 35 U.S.C. 154(b) by 212 days.

(21) Appl. No.: 11/494,071

(22) Filed: Jul. 27, 2006

(65) Prior Publication Data

US 2007/0043492 A1 Feb. 22, 2007

(30) Foreign Application Priority Data

Aug. 16, 2005 (DE) .................. 10 2005 038 616

(51) Int. Cl.
*B60Q 1/00* (2006.01)
(52) U.S. Cl. ..................................... 340/438
(58) Field of Classification Search ................. 340/438, 340/436, 457.1; 307/10.1, 45; 701/45
See application file for complete search history.

(56) References Cited

U.S. PATENT DOCUMENTS

| 5,357,141 | A | * | 10/1994 | Nitschke et al. ........... 307/10.1 |
| 5,363,303 | A | * | 11/1994 | Kaneko et al. ................ 701/45 |
| 6,647,331 | B2 | | 11/2003 | Imai et al. |
| 6,906,622 | B2 | | 6/2005 | Kleinschmidt et al. |
| 7,310,498 | B2 | * | 12/2007 | Henry et al. ................ 455/41.2 |
| 2005/0209753 | A1 | | 9/2005 | Koehler et al. |

FOREIGN PATENT DOCUMENTS

| DE | 3811217 | 10/1989 |
| DE | 10119621 | 10/2002 |
| DE | 10138764 | 10/2002 |
| DE | 10230485 | 1/2004 |
| DE | 60200337 | 5/2005 |
| DE | 102004001909 | 8/2005 |

* cited by examiner

*Primary Examiner*—Phung Nguyen
(74) *Attorney, Agent, or Firm*—Tarolli, Sundheim, Covell & Tummino LLP

(57) ABSTRACT

A method for controlling an active restraint system in a motor vehicle includes providing of several status signals, transferring of the status signals to a control algorithm as input values, and controlling the active restraint system according to the result of the control algorithm. The method is characterized by checking whether one or more of the status signals have failed, reproducing a failed status signal, and replacing the failed status signal by its reproduction.

8 Claims, 2 Drawing Sheets

METHOD FOR CONTROLLING AN ACTIVE RESTRAINT SYSTEM

TECHNICAL FIELD

The invention relates to a method for controlling an active restraint system in a motor vehicle.

BACKGROUND OF THE INVENTION

Information concerning the current status of the vehicle as regards driving dynamics is necessary for the activation of an active restraint system in a motor vehicle, e.g. a reversible belt tensioner system. Several sensors provide status signals for this, which are transferred as input values to a control algorithm. The control algorithm continuously evaluates the input values and decides whether, and possibly in which way, the active restraint system is activated (result of the control algorithm). In particular, the wheel rotation speed, the steering angle of the wheels, the yaw rate, longitudinal acceleration, transverse acceleration and brake activity (e.g. exceeding a particular brake pressure), are taken into consideration as input values.

If one or more of the sensors fail, the corresponding input values can not be transferred to the algorithm. The status as regards driving dynamics can not be determined precisely, or not precisely enough. In such a case, it is not possible to control the active restraint system properly in relation to the vehicle status, i.e. the system is no longer able to function.

It is an object of the invention to increase the reliability against failure of an active restraint system.

BRIEF SUMMARY OF THE INVENTION

To solve this problem, the invention proposes a method for controlling an active restraint system in a motor vehicle. The method comprises the following steps: providing several status signals, transferring the status signals to a control algorithm as input values, and controlling the active restraint system according to the result of the control algorithm. The method is characterized by the following steps: checking whether one or more of the status signals have failed, reproducing a failed status signal, and replacing the failed status signal by the reproduction. The invention is based on the finding that particular status values can be reproduced by computation from other status values on the basis of reciprocal geometric or physical dependencies. In accordance with the invention, a failed status signal is replaced by the reproduction, so that the necessary input value can be transferred to the control algorithm. The failure or malfunction of a sensor therefore does not automatically lead to a failure of the active restraint system. In this context, a (failed) status signal is to be understood to mean not only a signal which is not present, but also a faulty or incomplete signal.

For reproducing the failed status signal, a signal can be used which is not provided as an input value for the control algorithm. This is important when a failed status signal can not be reproduced from the other status signals which are transferred as an input value to the control algorithm. In such a case, other information is drawn upon to reproduce the failed status signal, e.g. information concerning the gear which is engaged, the engine speed or the (differential) gear ratio.

Protection of the function of the active restraint system can be further increased by at least one other reproduced status signal being used to reproduce the failed status signal. In this way, the function of the active restraint system can even be maintained when several status signals have failed.

DETAILED DESCRIPTION OF THE PREFERRED EMBODIMENTS

Figure 1:
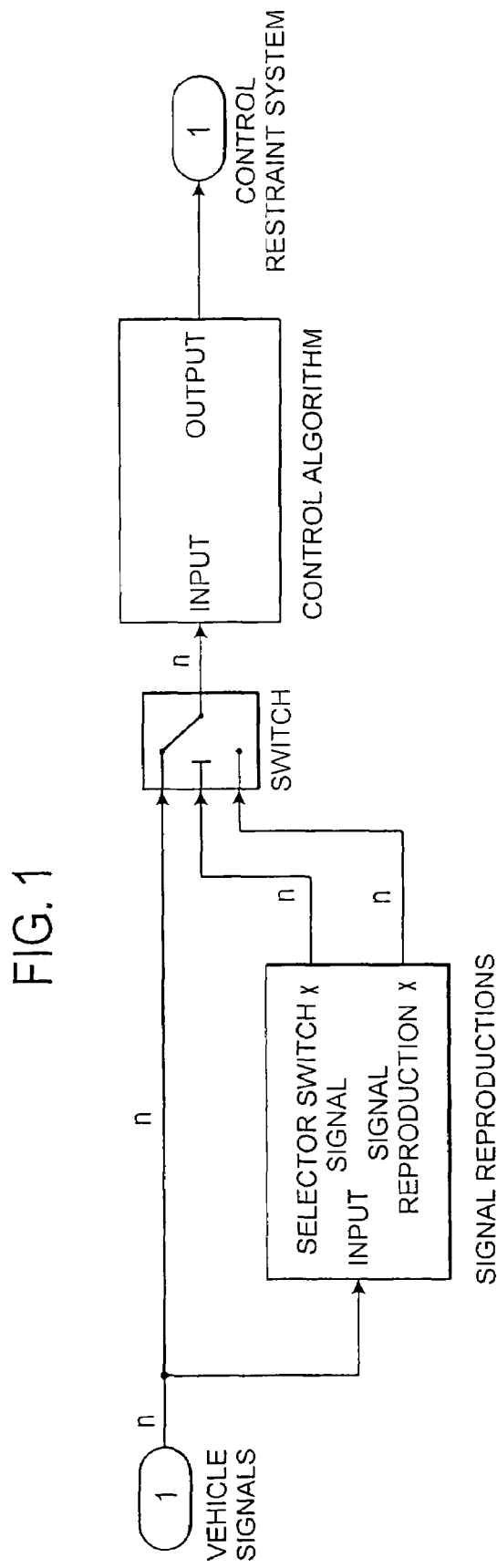
FIG. 1 shows a block diagram of the method according to the invention.

In FIG. 1 a possible practical realization of the method according to the invention is illustrated in the form of a block diagram. The control algorithm requires n status signals as input values. The supplied status signals are processed in the block "signal reproductions". A check is made here as to whether the individual status signals are complete and free of error. A failed (i.e. missing, faulty or incomplete) status signal is reproduced from the status signals or other signals which are present. The failed status signal is then replaced by its reproduction and is supplied as an input value to the control algorithm.

Figure 2:
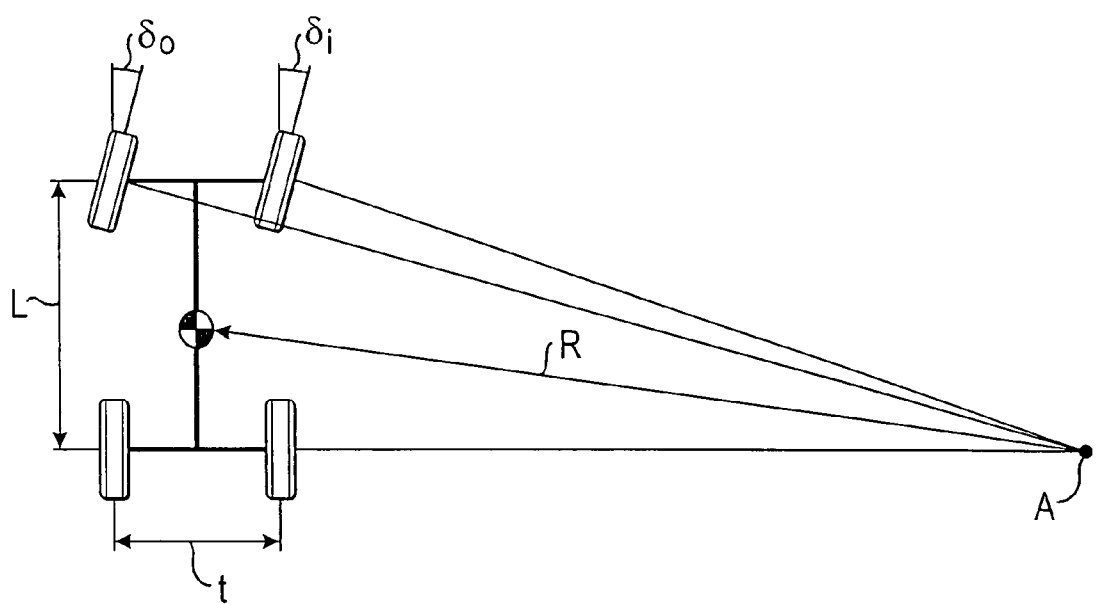
FIG. 2 shows a two-track model of a motor vehicle.

The reproduction of particular status signals in accordance with the invention is explained below with the aid of examples. Particular status values can be calculated mathematically from other values with the basis of a suitable driving dynamics model. The two-track model illustrated in FIG. 2 comes into consideration, for example, as a driving dynamics model. The geometric values shown in FIG. 2 are designated as follows:

A: centre of rotation,
R: radius of rotation of the vehicle,
L: wheel base,
t: track width,
$\delta_i$, $\delta_o$: steering angle of the inner curve and outer curve wheel.

Other values, such as the speed of the vehicle or the rotation rate of the wheel are independent of the selected geometric model.

The following formulae or approximations are produced:

$$(1), (2), (3)$$

with $\Omega_z$: yaw rate,
V: vehicle speed,
$A_y$: transverse acceleration.

In addition, the rotational speed of the wheel (and hence also the speed of the vehicle) can be calculated from the engine speed and the transmission between the engine and the driven wheel:

$$W = E \cdot D \cdot G \qquad (4)$$

with

W: rotational speed of the wheel,
E: engine speed,
D: differential gear ratio,
G: gear ratio (dependent on selected gear).

In the case of a failure or malfunction of a sensor, the associated status signals for the wheel rotation speed W, the steering angle of the wheels $\delta_i$ and $\delta_o$, the yaw rate $\Omega_z$, and the transverse acceleration $A_y$ can be reproduced, by means of these formulae or approximations, as follows:

On failure of the yaw rate signal $\Omega_z$, this is estimated from the vehicle speed V, the wheel base L, the track width t and the steering angle $\delta_o$: The radius of rotation R can be determined from (3) and can be inserted into the formula for the calculation of the yaw rate (1).

On failure of the transverse acceleration signal $A_y$, this is estimated from the vehicle speed V and the yaw rate $\Omega_z$, inserted in (2).

On failure of the wheel rotational speed signal W, this is estimated from the engine speed E and the transmission ratio between the engine and the driven wheel, taking into account the selected gear, inserted in (4).

On failure of the steering angle signal $\delta_{l,o}$, this is estimated from the transverse acceleration $A_y$ and the vehicle speed V: The rotation radius R can be determined from (2) and this can be inserted into the formula for the calculation of the steering angle (3).

As already mentioned, signals which have already been reproduced themselves can be used for the reproduction of particular status signals.

The following three tables give an overview of the strategies on failure of one, two or three status signals.

TABLE 1

| Wheel rotation speed sensor | Steering angle | Yaw rate sensor | Transverse acceleration sensor | Engine speed | Brake activation sensor | Algorithm status | Sensor Failure Strategy | Formula |
|---|---|---|---|---|---|---|---|---|
| Out of order | OK | OK | OK | OK | OK | remains active | Wheel rotation speed is calculated from engine speed, gear ratio and differential gear ratio | $V_w = E*D*G$ |
| OK | Out of order | OK | OK | OK | OK | remains active | Steering angle is calculated from transverse acceleration and wheel speed | $A_y = V_w^2/R$ $\delta = L/(R + t/2)$ |
| OK | OK | Out of order | OK | OK | OK | remains active | Yaw rate calculated from speed and steering angle | $\Omega_2 = V/R$ $\delta = L/(R + t/2)$ |
| OK | OK | OK | Out of order | OK | OK | remains active | Transverse acceleration is calculated from steering angle and wheel speed | $A_y = V_w^2/R$ $\delta = L/(R + t/2)$ |
| OK | OK | OK | OK | Out of order | OK | remain active | Is only required if the wheel rotation speed is faulty | |

TABLE 2

Scenarios when two signals fail:

| Wheel rotation speed sensor | Steering angle | Yaw rate sensor | Transverse acceleration sensor | Engine speed | Brake activation sensor | Algorithm status | Sensor Failure Strategy | Formula |
|---|---|---|---|---|---|---|---|---|
| Out of order | Out of order | OK | OK | OK | OK | remains active | Wheel speed is calculated from engine speed, gear ratio and differential gear ratio. Steering angle is calculated from transverse acceleration and calculated wheel rotation speed. | $V_w = E*D*G$ $A_y = V_w^2/R$ $\delta = L/(R + t/2)$ |
| OK | OK | Out of order | Out of order | OK | OK | remains active | Yaw rate calculated from speed and steering angle. Transverse acceleration is calculated from steering angle and wheel speed. | $A_y = V_w^2/R$ $\delta = L/(R + t/2)$ $\Omega_2 = V/R$ |
| Out of order | OK | Out of order | OK | OK | OK | remains active | Wheel speed is calculated from engine speed, gear ratio and differential gear ratio. Yaw rate calculated from calculated speed and steering angle. | $V_w = E*D*G$ $\Omega_z = V/R$ $\delta = L/(R + t/2)$ |
| Out of order | OK | OK | Out of order | OK | OK | remains active | Wheel speed is calculated from engine speed, gear ratio and differential gear ratio. Transverse acceleration is calculated from steering angle and calculated wheel speed. | $V_w = E*D*G$ $A_y = V_w^2/R$ $\delta = L/(R + t/2)$ |
| OK | Out of order | Out of order | OK | OK | OK | remains active | Steering angle is calculated from transverse acceleration and wheel speed. Yaw rate calculated from speed and calculated steering angle. | $A_y = V_w^2/R$ $\delta = L/(R + t/2)$ $\Omega_z = V/R$ |
| OK | Out of order | OK | Out of order | OK | OK | remains active | Steering angle is calculated from yaw rate and wheel speed. Transverse acceleration is determined from wheel | $A_y = V_w^2/R$ $\delta = L/(R + t/2)$ $\Omega_z = V/R$ |

TABLE 2-continued

Scenarios when two signals fail:

| Wheel rotation speed sensor | Steering angle | Yaw rate sensor | Transverse acceleration sensor | Engine speed | Brake activation sensor | Algorithm status | Sensor Failure Strategy | Formula |
|---|---|---|---|---|---|---|---|---|
| | | | | | | | speed and calculated steering angle. | |

TABLE 3

| Wheel rotation speed sensor | Steering angle | Yaw rate sensor | Transverse acceleration sensor | Engine speed | Brake activation sensor | Algorithm status | Sensor Failure Strategy | Formula |
|---|---|---|---|---|---|---|---|---|
| Out of order | OK | Out of order | Out of order | OK | OK | remains active | Wheel speed is calculated from engine speed, gear ratio and differential gear ratio. Yaw rate calculated from calculate speed. Steering angle transverse acceleration is calculated from steering angle and calculated wheel speed. | $V_w = E*D*G$<br>$A_y = V_w^2/R$<br>$\delta = L/(R + t/2)$<br>$\Omega_z = V/R$ |
| OK | Out of Order | OK | Out of order | Out of Order | OK | remains active | Steering angle is calculated from yaw rate and wheel speed. Transverse acceleration is calculated from yaw rate and wheel speed. Engine speed not required. | $\Omega_z = V/R$<br>$\delta = L/(R + t/2)$<br>$A_y = V_w^2/R$ |
| Out of order | Out of Order | Out of order | OK | OK | OK | remains active | Wheel speed is calculated from engine speed, gear ratio and differential gear ratio. Steering angle is calculated from transverse acceleration and calculated wheel speed. Yaw rate calculated from speed and steering angle. | $V_w = E*D*G$<br>$A_y = V_w^2/R$<br>$\delta = L/(R + t/2)$<br>$\Omega_z = V/R$ |
| Out of order | Out of Order | OK | Out of order | OK | OK | remains active | Wheel speed is calculated from engine speed, gear ratio and differential gear ratio. Transverse acceleration is calculated from yaw rate and calculated wheel speed. Steering angle from yaw rate and speed. | $V_w = E*D*G$<br>$\Omega_z = V/R$<br>$A_y = V_w^2/R$<br>$\delta = L/(R + t/2)$ |
| Out of Order | Out of order | OK | OK | Out of Order | OK | remains active | Wheel speed is calculated from transverse acceleration and yaw rate. Steering angle is calculated from transverse acceleration and calculated wheel speed. Engine speed not required. | $A_y = V_w^2/R$<br>$\Omega_z = V/R$<br>$\delta = L/(R + t/2)$ |
| Out of order | OK | Out or Order | OK | Out of order | OK | remains active | Wheel speed is calculated from steering angle and transverse acceleration. Yaw rate is from steering angle and calculated wheel speed. Engine speed not required. | $A_y = V_w^2/R$<br>$\delta = L/(R + t/2)$<br>$\Omega_z = V/R$ |

The invention claimed is:

1. A method for controlling an active restraint system in a motor vehicle, the method comprising the following steps:
   providing several status signals,
   transferring the status signals to a control algorithm as input values, and
   controlling of the active restraint system according to the result of the control algorithm,
   checking whether one or more of the status signals have failed,
   reproducing a failed status signal by computation, and
   replacing the failed status signal by the reproduction of the failed status signal.

2. The method according to claim 1, wherein for reproducing the failed status signal, at least one other reproduced status signal is used.

3. The method according to claim 1, wherein the active restraint system is a reversible belt tensioner system.

4. The method according to claim 1 wherein the step of reproducing the failed status signal includes calculating the reproduction of the failed status signal using at least one of the status signals other than the failed status signal.

5. The method according to claim 1 wherein the failed status signal represents a steering angle of the vehicle, the step of reproducing the failed status signal includes calculating the steering angle using transverse acceleration of the vehicle and a wheel rotation speed of the vehicle.

6. The method according to claim 1 wherein the failed status signal represents a yaw rate of the vehicle, the step of reproducing the failed status signal includes calculating the yaw rate using speed of the vehicle and steering angle of the vehicle.

7. The method according to claim 1 wherein the failed status signal represents a transverse acceleration of the vehicle, the step of reproducing the failed status signal includes calculating the transverse acceleration using a wheel speed of the vehicle and steering angle of the vehicle.

8. A method for controlling an active restraint system in a motor vehicle, the method comprising the following steps:

providing several status signals, transferring the status signals to a control algorithm as input values, and controlling of the active restraint system according to the result of the control algorithm, checking whether one or more of the status signals have failed, reproducing a failed status signal, and replacing the failed status signal by the reproduction of the failed status signal, wherein for reproducing the failed status signal, a signal is used which is not provided as an input value for the control algorithm.

* * * * *